(No Model)
A. P. MORROW.
MEANS FOR FASTENING SPOKES TO VEHICLE WHEELS.
No. 586,138. Patented July 13, 1897.
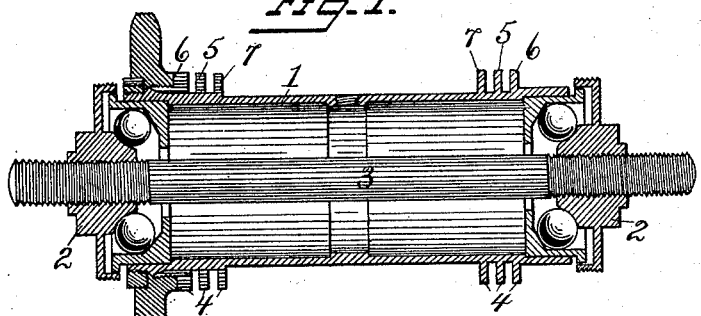
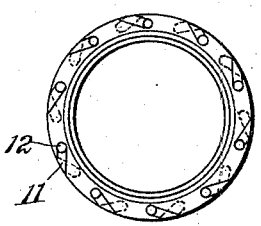
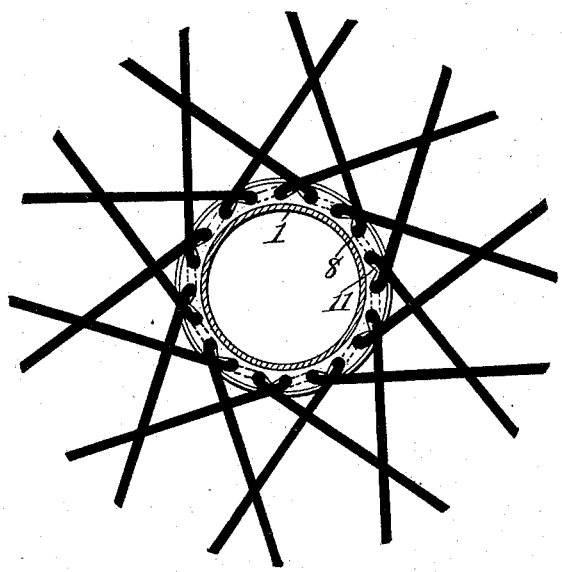
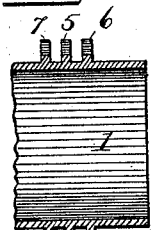
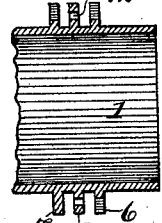
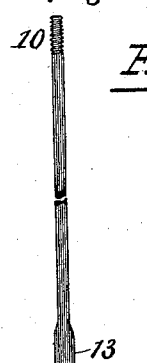
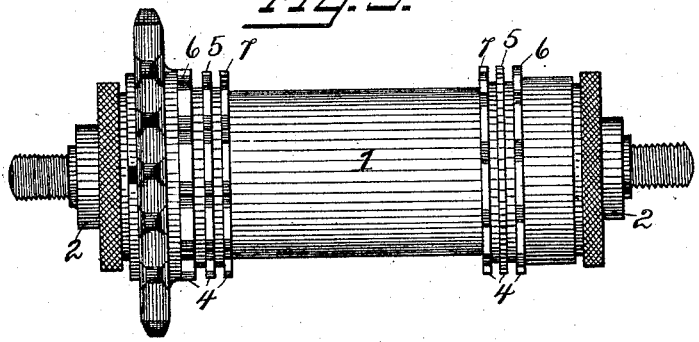
Witnesses.
Albert Popkins.
Carrie L. Acker.
Inventor.
Alexander P. Morrow
By Jas. L. Skidmore
His Attorney.

UNITED STATES PATENT OFFICE.

ALEXANDER P. MORROW, OF ELMIRA, NEW YORK.

MEANS FOR FASTENING SPOKES TO VEHICLE-WHEELS.

SPECIFICATION forming part of Letters Patent No. 586,138, dated July 13, 1897.

Application filed October 12, 1896. Serial No. 608,574. (No model.)

*To all whom it may concern:*

Be it known that I, ALEXANDER P. MORROW, a citizen of the United States, residing at Elmira, in the county of Chemung and State of New York, have invented certain new and useful Improvements in Means for Fastening Spokes to Vehicle-Wheels; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to vehicle-wheels adapted especially for use on bicycles and like machines, and its primary object is to provide improved means for securing the inner ends of the spokes to the wheel-hub.

The characteristic features of my invention will be fully described hereinafter, and defined in the appended claims.

In the accompanying drawings, Figure 1 is a longitudinal section of a wheel-hub embodying my invention. Fig. 2 is a transverse section of the hub with the spokes applied thereto. Fig. 3 is an elevation of the hub with the spokes detached. Fig. 4 is an end view of the hub, showing one of the spoke-securing flanges thereof in elevation. Figs. 5 and 6 are detail sectional views illustrating different forms of slots or openings in the hub-flanges for receiving the ends of the spokes, and Fig. 7 is a view of one of the spokes detached.

The cylindrical body 1 of the hub may be of any preferred construction and equipped with any suitable end bearings, as 2, for the shaft or axle 3.

Upon the hub 1, near each of its ends, I provide a series of concentric annular flanges 4, each series comprising a central flange 5, an outer flange 6, and an inner flange 7. Each of these several flanges is formed with slots, perforations, or openings adapted to receive transverse heads 8, formed on and secured to the inner ends 9 of the spokes, the outer ends 10 of which are screw-threaded for attachment to the wheel rim or felly.

The spokes are secured to the hub-flanges by passing the head 8 of the spoke through one of the slots 11 of one of the flanges 6 or 7 until the said head enters an opening 12 in the central flange. Thus the spoke is held between the two flanges which it engages.

The spokes are arranged alternately on opposite sides of the central flange 5, but the heads of all of said spokes project into openings in the central flange.

It will be understood that after the head of the spokes shall have been properly inserted in the slots, perforations, or openings in the flanges said spokes are moved to a tangent position in respect to the hub, thereby insuring their retention in the flanges of the hub and reducing to a minimum the possibility of the spokes either pulling or working out of the said flanges.

While I do not confine myself to any special form of the slots, perforations, or openings in the flanges, I preferably form the central flange with circular holes 12 and the outer and inner flanges with inclined or undercut edge or peripheral slots 11. By this construction the inner ends of the cross-heads of the spokes project into the round openings in the central flange, while their outer ends rest in the slots 11 of the adjacent flanges on opposite sides of the central flange alternately.

As illustrated in Fig. 3, my improved construction permits a crossing of the spokes, with the result of strengthening the wheel structure, and, as will be apparent, any one spoke may be renewed or removed without disturbing the remaining ones.

It is of course immaterial whether the flanges 5, 6, and 7 are formed integral with the hub 1 or separate therefrom and secured by any suitable means.

I preferably thicken or reinforce the spoke at its headed end, as indicated at 13, to increase its strength.

Having thus described my invention, what I desire to claim and secure by Letters Patent is—

1. A wheel-hub provided with a series of annular flanges comprising a central and side flanges, each of said flanges being provided with slots or openings, in combination with headed spokes adapted to enter said slots or openings.

2. A wheel-hub provided with two annular flanges, one of said flanges having holes or perforations and the other provided with open slots extending to the periphery thereof, in combination with headed spokes adapted to enter said slots or openings.

3. The combination with a wheel-hub, of a series of annular flanges comprising a central flange and an inner and an outer flange, said flanges being provided with slots or openings, and a series of spokes provided with heads, each of said heads being adapted to enter an opening in the central flange, and an alined opening in one of the other flanges.

4. The combination with a wheel-hub, of a series of annular flanges comprising a central flange provided with openings to receive the cross-head of the spoke, and parallel inner and outer flanges provided with inclined or undercut slots.

5. A hub having two series of annular flanges, each series comprising a central flange provided with perforations, and a concentric outer and inner flange provided with slots, in combination with spokes provided with heads adapted to be secured to the central flange and to one of the slotted flanges.

6. The combination with a hub provided adjacent to each of its ends, with a series of concentric flanges provided with openings, of headed spokes, secured to the central flange, and alternately to the other flanges of the series.

In testimony whereof I affix my signature in presence of two witnesses.

ALEXANDER P. MORROW.

Witnesses:
FRANCIS X. DISNEY,
A. H. GLEASON.